Feb. 27, 1962
B. H. SEIBEL
3,022,578
DISCONTINUITY DEPTH GAUGE
Filed Feb. 26, 1958
2 Sheets-Sheet 1
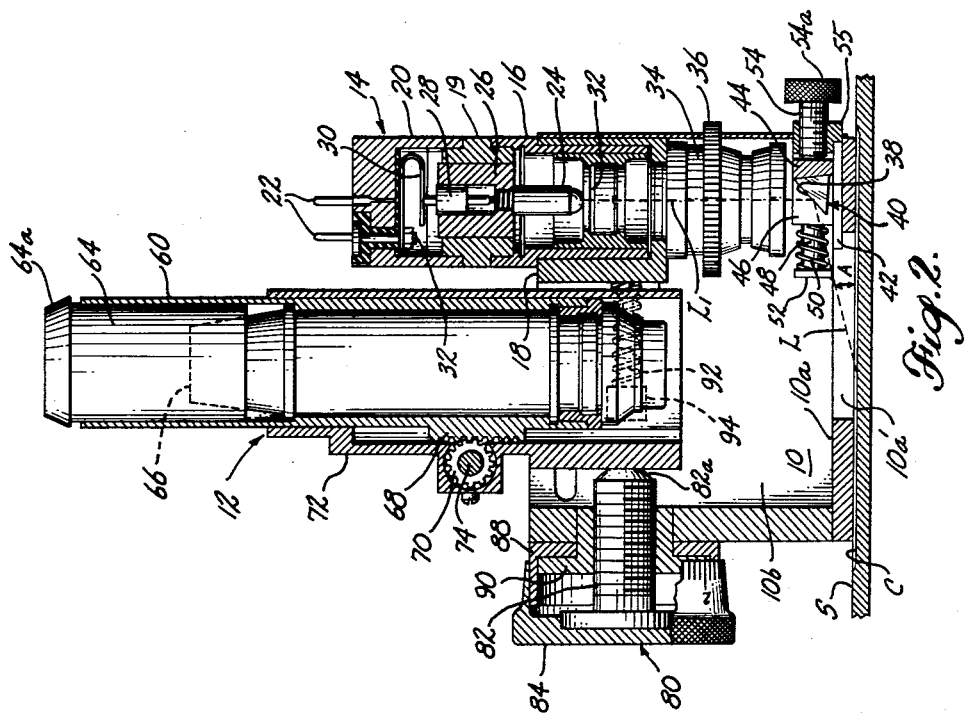
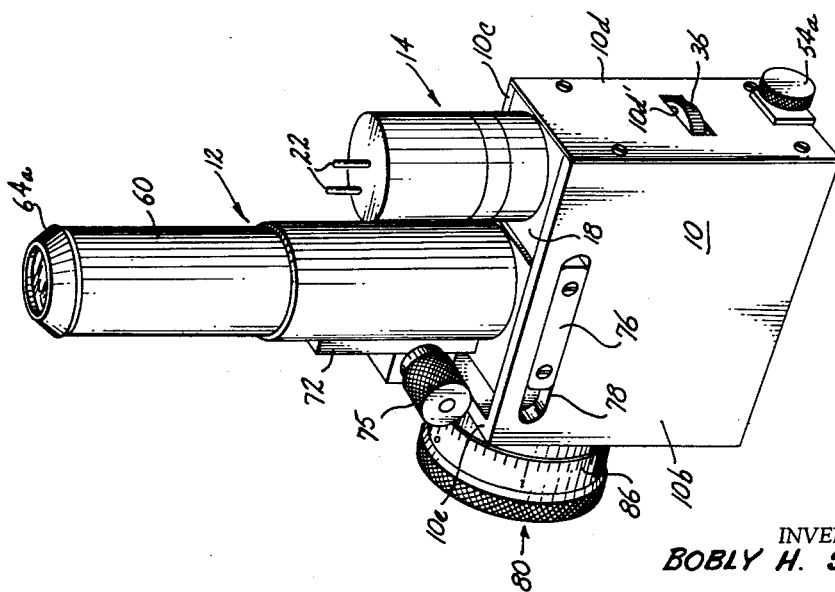
INVENTOR.
BOBLY H. SEIBEL
BY
ATTORNEYS

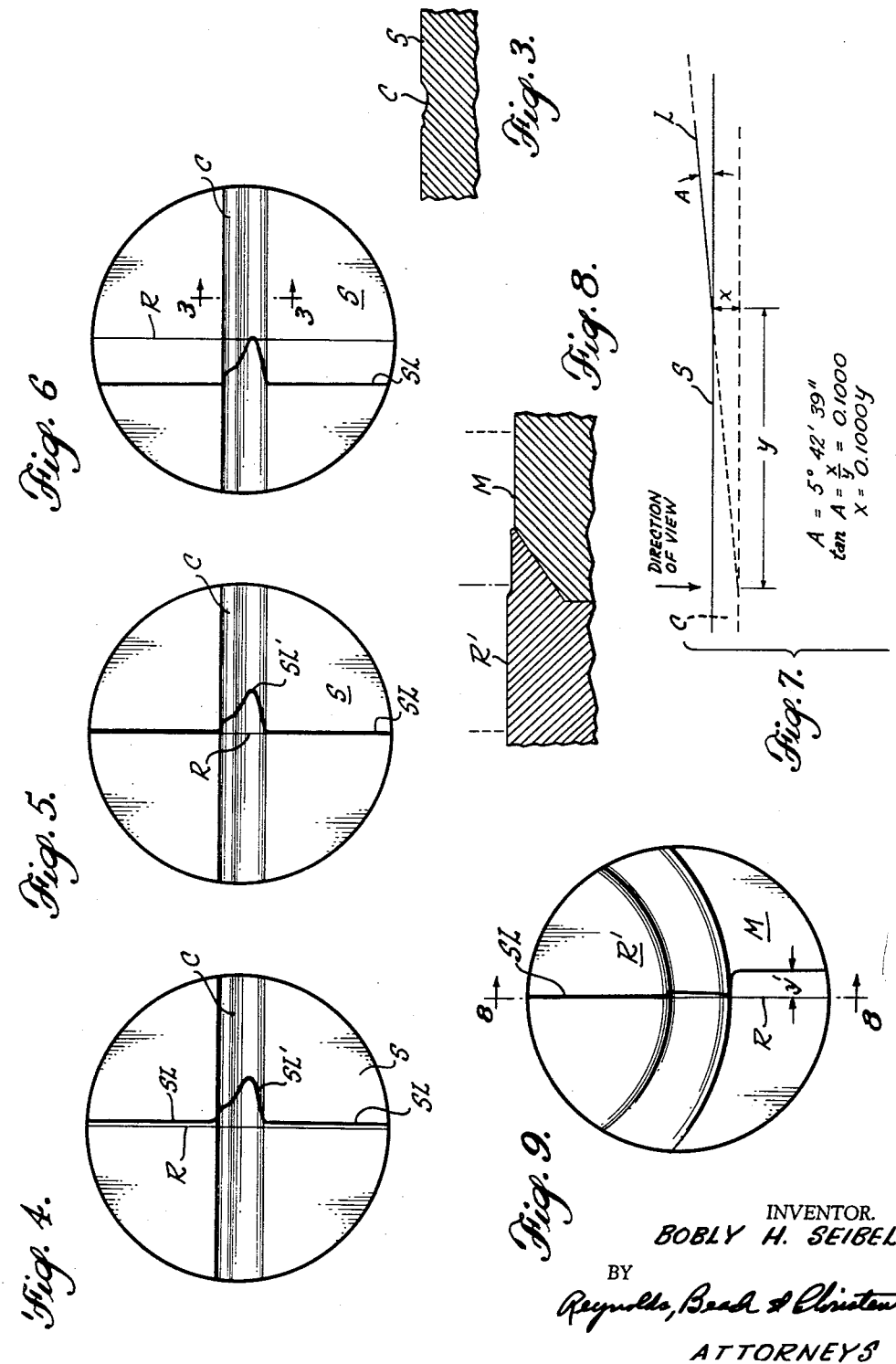

United States Patent Office 3,022,578
Patented Feb. 27, 1962

1

3,022,578
DISCONTINUITY DEPTH GAUGE
Bobly H. Seibel, Seattle, Wash., assignor to Boeing Airplane Company, Seattle, Wash., a corporation of Delaware
Filed Feb. 26, 1958, Ser. No. 717,588
4 Claims. (Cl. 33—46)

This invention relates to an optical gauge for measuring the depth of scratches and other surface discontinuities and is herein illustratively described by reference to the presently preferred form thereof. However, it will be recognized that certain modifications and changes therein with respect to details may be made without departing from the essential features involved.

There are various applications for this invention, among which is the testing of aircraft structural materials. A scratch or similar defect of excessive depth can, of course, so greatly weaken a length of tubing or other member as to render it incapable of assuming the design loads. For instance, scratches in aluminum alloy tubing for airplane use are usually considered excessive if they exceed 10% of the wall thickness. The opposing requirements of safety standards and of economy of materials make it essential, therefore, that any instrument of the present type be capable of reliably measuring scratch depth with a high degree of accuracy. Moreover, the instrument should function throughout a large range of scratch depths such as from 0.00005 inch to 0.030 inch, either on flat or contoured surfaces. It is also important that such a gauge provide consistently reliable measurements on narrow deep scratches as well as on broad open ones.

A further object of this invention is to provide a gauge which is quickly and easily operated, and one which may be used by relatively unskilled and untrtained personnel.

Another object is to provide an optical scratch or discontinuity depth gauge which is compact and portable and which is highly versatile in its application to the measurement of the depth of different types and formations of surface irregularities or discontinuities.

Still another and related object is such a gauge which is self-referencing with respect to any surface on which it is placed and which, therefore, may be set up and operated without critical preparations or adjustments of the gauge in its positional relationship to the surface under examination.

The former methods for analyzing surfaces for dangerously deep scratches were very crude. One such technique was to run the fingernail over or along a scratch in an attempt to sense its approximate depth. Obviously, such a test was very inaccurate and unreliable, depending entirely on human judgment. A very fine but deep scratch could go undetected or could be entirely deceptive in its depth when examined by that method. In still another prior method, plaster molds were made of scratches and other defects in order to measure their depth by means of a micrometer applied to the hardened mold upon its removal from the surface. However, this process was unreliable because of the tendency for the plaster to fail to penetrate fully to the bottom of a narrow scratch or crack, or to break off during its removal therefrom, so that the true depth could not be measured.

Also attempts have been made to develop instruments for measuring scratch depth but most of these have not been successful, and one that has been used somewhat was incapable of achieving a sufficient degree of accuracy and resolution in detecting and measuring depth.

In accordance with this invention, the base of the gauge is placed against or otherwise referenced to the surface to be scrutinized and a pattern of light rays producing the image of a straight line on a flat projection surface is projected at a large angle of incidence onto the surface to be examined so as to intersect transversely a scratch or other discontinuity therein to be measured for depth. The resulting shadow line image appearing on the surface extends to the edges of the scratch, and between those edges traces out in plan the profile of the scratch so that it may be viewed through a microscope system having a reticle positioned by a micrometer. Preferably the micrometer is initially at its zero setting and the shadow line is moved to establish coincidence between one extremity of the scratch profile image and the reticle. Thereupon resetting of the micrometer to advance the reticle along the scratch into a position of coincidence with the opposite extremity of the scratch profile image produces a micrometer reading which is proportional to or a direct indication of scratch depth.

By orienting the microscope axis perpendicular to the surface and projecting the pattern of light rays onto the surface at a shallow surface angle the profile image of the scratch appears greatly magnified in its depth aspect. This magnification when added to the magnifying power of a practical microscope system provides an extremely high degree of resolution and accuracy in the depth measurements obtained.

These and other features, objects and advantages of the invention will become more fully evident from the following description thereof by reference to the accompanying drawings illustrating the preferred embodiment as well as typical applications thereof.

FIGURE 1 is a perspective view of the instrument in its preferred form.

FIGURE 2 is a longitudinal vertical sectional view taken approximately through the midplane of the instrument.

FIGURE 3 is an enlarged sectional view taken on line 3—3 in FIGURE 6, of a portion of surface having a scratch whose depth is to be measured.

FIGURE 4 is a view illustrating the appearance of the scratch, the projected line image, and the reticle all as viewed in superimposed relation through the microscope system of the instrument.

FIGURES 5 and 6 are views similar to FIGURE 4 but illustrating successive steps in the measurement procedure.

FIGURE 7 is a diagram illustrating a trigonometric relationship involved in the scratch depth measurement.

FIGURE 8 is an enlarged sectional view of a surface having a different type of discontinuity (a rivet setting) to be measured for depth.

FIGURE 9 is a view illustrating the appearance of the surface in FIGURE 8 as viewed through the microscope system of the gauge.

Referring to the drawings, the instrument comprises a body or base 10 which includes a bottom wall 10a having a generally central viewing slot 10a' and which is adapted for placement directly upon, or in predetermined positional relationship with a surface S to be examined. Opposite side walls 10b and 10c project upwardly from opopsite edges of the bottom wall. These side walls are integrally joined by one end wall 10e and are interconnected by a removable opposite end wall 10d. The base 10 carries a microscope system 12 and a light projector system 14, both being optically directed toward the slot opening 10a' and adapted to focus on any surface S having a scratch C or other discontinuity to be measured for depth.

The light source 14 comprises a tubular sleeve 16 held in a fitting 18. The latter is secured in upright position between the side walls 10b and 10c, and adjacent to the end wall 10d. An annular bushing 19 is fitted into the upper end of the sleeve 16 and in turn serves as a support for the lower end of a cover 20 carrying the electric lamp plug terminals 22. The base of an electric lamp bulb 24 is threaded into a tubular socket fitting 26 retained within the bushing 19. Electrical contact with the center terminal of the lamp bulb is established through a plunger 28 and a contact spring 30. One end of this spring bears downwardly against the top of the plunger and its opposite end is made fast to a binding post 32.

Within the lower portion of the sleeve 16, in front of lamp 26, is mounted a line-image forming unit 32. Light passing through this unit is collected by a projector lens system 34. The latter is of any suitable or conventional type adapted for projecting an image of the line. A focus wheel 36 adjusts the focus of lens system 34, the edge of such wheel projecting accessibly through a slot 10 d' in the end wall 10d.

The resulting focused pattern of light rays carrying the line image are intercepted by a direction-changing reflector such as the inclined surface 38 of a prism 40 and are reflected thereby onto the surface S through slot 10a at a large incidence angle. The line of incidence, L, lies at an angle A to the plane of the surface S. While this angle may be different values, it is preferably 5°42′39″ for a reason to be described.

The prism 40 is movable in a direction perpendicular to the projected line image and parallel to the surface S, such movement being in the plane of incidence of the projected light beam. To this end the prism is carried by a block 44 mounted on a slider 42. The latter is suitably mounted for movement on the base plate 10a. The block 44 is notched to accommodate the prism between its sides 46 without interferring with the light path. Guide pins 48 mounted on stops 52, slide in bores (not shown) in the respective block sides 46. A helical spring 50 encircles each such pin to react under compression between the stop 52 and the adjacent side of the block 44. The adjusting screw 54, threaded in a wall fitting 55, bears against the outside face of the block 44 and, in cooperation with springs 50, provides a means for moving the prism back and forth. The screw is turned manually by means of a knob 54a accessible from the exterior of the base 10. The reflected shadow line projected onto the surface S is therefore movable through various positions parallel to itself by turning the knob 54a.

The microscope system 12 comprises the barrel 60 incorporating the necessary lens elements and associated components. In this instance, these include the objective lens unit 62, the eye piece 64 including the eye piece focusing ring 64a, and a microscope reticle 66 which preferably comprises a hairline element (not shown) oriented parallel to the projected shadow line as it appears on the surface S in the focal plane of the microscope. The microscope barrel 60 has a longitudinal rack 68 engaged by a pinion 70 mounted in the barrel casing 72. The pinion 70 is on a shaft 74 carrying a knob 75. By means of this pinion the microscope assembly is raised and lowered in order to bring the surface S into focus for the viewer. The microscope body or casing 72 carries a pair of sliders 76 on respectively opposite sides of the lower portion thereof, which sliders are engaged in tracks or slots 78 formed in the opposite side walls 10b and 10c and extending parallel to base plate 10a. By means of these sliders engaged in the slots the microscope assembly, including the reticle, is movable parallel to surface S in a plane coincident with or parallel to the incidence plane of the reflected light rays from the projector unit 14, so that the reticle of the microscope is movable into various positions parallel to itself and to the shadow line projected onto the viewing surface S. Movement of the microscope in this manner is effected by calibrated micrometer screw means 80 consisting of a micrometer spindle or screw 82 and a knob 84 thereon. A calibrated dial flange 86 on knob 84 cooperates with a circular index flange 88 mounted on the end wall 10e of the base 10 as shown. A threaded bushing 90 fixed in the end wall of the base 10, together with the index flange 88 serves as a support for the micrometer. The tip of the micrometer screw is convexly rounded at 82a to bear against the adjacent side of the microscope housing. Clockwise rotation of the screw forces the microscope housing toward the projector unit 14 whereas counter-clockwise rotation of the micrometer screw permits return movement of the microscope housing. Such return movement is effected by means of a pair of return springs 92 located within the housing 10 at respectively opposite sides of the microscope and adapted to bear against shoulder surfaces 94 on casing 72. The opposite end of these springs bear against a suitable bearing surface on the adjacent side of the fitting 18. These return springs 92 at all times maintain the microscope housing in contact with the tip of the micrometer screw 82 and maintain the threads of the micrometer screw against the same thread surfaces within the bushing 90, so that the accuracy of the readings obtained by means of the micrometer are not impaired by any free-play in the micrometer threads.

Referring to FIGURE 3, the illustrated surface S under examination is assumed to have a scratch C or other discontinuity to be measured for depth. FIGURES 4, 5 and 6 depict the appearance of the scratched surface in the focal plane of the microscope system. The surface is assumed to be substantially flat, so that shadow line image SL appears as a substantially straight line. However, surface S need not be flat since it is only necessary that the measurement be referred to the shadow line image location at the edges of the scratch and it does not particularly matter whether the image SL is straight or curved beyond those edges. For all practical purposes, however, the magnification of microscope 12 is such that even with a curved surface S, the line image SL will appear as a substantially straight line except for the portion intersected by and lying between the edges of the scratch C. This portion, of course, traces the profile of the scratch C and has a generally U or V configuration, depending upon the profile shape of the scratch.

The length in depth of the scratch profile image SL′ is, of course, dependent upon the depth of the scratch and upon the angle of incidence of the incident light beam L in relation to the surface S. In FIGURE 7 there appears a diagram depicting the relationship between the depth "$y$" of the scratch profile image SL′ and the true depth "$x$" of the scratch itself at the point of intersection of projection line L. The angle A is the complement of the incidence angle. In the illustration the angle A is set at 5°–42′–39″. This is a convenient angle for calibration of the micrometer, since its tangent is 0.1000. By a simple transposition of terms it is obvious that the depth "$x$" of the scratch C is equal to $\frac{1}{10}$ the viewed length of the profile image SL′. Consequently, in order to read scratch depth directly on the micrometer, it is only necessary to calibrate the micrometer dial in fractions of an inch at a scale of one-tenth the actual distances moved by the microscope when turning the micrometer dial.

Operational procedure with the instrument is as follows: With the base 10 placed on surface S to expose a scratch C in viewing slot 10a, the focusing ring 36 is rotated until a sharp hairline image SL appears on the surface. Thereupon the instrument in oriented so that the line SL transversely intersects the scratch, preferably at right angles. Now the microscope is focused to view the scratch and hairline as in FIGURE 4, and knob 54a is turned until the hairline advances into coincidence with reticle line R (FIGURE 5). The micrometer head 84 is then rotated from its preset zero position in a direction which advances the microscope unit, hence the reticle line R, to the point of tangency of the line R to the apex of the scratch profile image SL′, as shown in FIGURE 6. For accuracy, the reticle line R is always referenced to the same side of shadow line image SL (SL') so that finite thickness of the line image does not affect the readings. The resultant setting of the micrometer dial in the position of the reticle in FIGURE 6 provides a direct reading of the depth of the scratch, "x."

In FIGURE 8 another application of the apparatus is illustrated; namely, that of measuring the offset between the head of a rivet R' and the surrounding metal surface M containing the rivet. In aircraft applications it is usually desirable to provide flush-set rivets, since projections create aerodynamic drag. Portions of the rivet R' and adjacent surrounding metal surface M appear in FIGURE 9, as viewed through the microscope of the depth gauge. Following the procedure previously described, the reticle line R is initially contacted by one extreme portion of the shadow line SL with the micrometer in its zero setting. Thereupon the micrometer is reset in order to advance the reticle into coincidence with the opposite extreme portion of the shadow line SL. The intervening movement, Y', of the reticle represents the amount of offset to be measured and is read directly on the micrometer dial.

It will be recognized that a single-line reticle system, preferably wherein the reticle is fixed in the microscope system and the entire microscope is movable by the micrometer in order to move the reticle in relation to the shadow line, and a system wherein the shadow line is itself adjustable independently of the reticle for meeting the initial setting of the reticle, offers the most convenient and the preferred arrangement for the instrument.

The apparatus is illustrated and described herein as incorporating a light source adapted for projecting onto the surface a pattern of light rays which produced the image of a substantially straight hairline shadow image on the surface. It will be recognized that the term "line" as used herein generally includes not only a continuous line but any equivalent configuration, such as a dashed line or series of dots, etc., and that it includes the straight boundary between a light and a dark area as well as a hairline shadow, or a hairline of light on a shadowy background, or still other suitable and equivalent illuminated line formations.

From the foregoing description, it will be recognized that the invention has various useful applications and possible forms, and that the details of the illustrated embodiment are representative but not necessarily the only details by which the apparatus may be constructed and operated.

I claim as my invention:

1. A portable surface discontinuity depth measuring gauge comprising a portable base adapted for positioning in predetermined relationship to an external relatively immobile surface, a light source mounted on said base and including means for projecting onto said surface at a relatively large incidence angle a pattern of light rays producing a substantially straight line image, said line image being transverse to the plane of incidence, said base being positionable in relation to said surface for causing said line image to intersect transversely a scratch or other surface discontinuity to be measured for depth and thereby form on said surface an illuminated profile image of such discontinuity magnified in its depth aspect proportionally to said incidence angle, microscope means mounted on said base in predetermined relation to said light source and having an optical axis extending transversely to the surface for viewing said line image including said illuminated profile, said microscope means including a reticle means and a reticle line, said reticle means superimposing said reticle line on the line image and illuminated profile image viewed through said microscope means, said means for projecting the line image including movably mounted means on said base operable to move the line image transversely while maintaing it parallel to itself and while maintaining the incidence angle constant to an initial position in which said reticle line is substantially coincident with a depth extremity of said illuminated profile image, means for moving said reticle line transversely while maintaining it parallel to itself, calibrated means for measuring the amount of the reticle line's movement between depth extremities of said illuminated profile image, thereby to measure the depth of said profile image and thereby the depth of the surface discontinuity represented thereby.

2. The gauge defined in claim 1, wherein the light source comprises a source of illumination fixed on the base and having its axis of projection directed transversely to the surface, and said means operable to move the line image includes a movable inclined reflector mounted on the base in position, proximate to the surface, to intercept and reflect the projected light onto said surface at a large incidence angle, said reflector comprising the movably mounted means of the light source.

3. The gauge defined in claim 2, wherein the microscope means is movable in relation to said base in a direction substantially parallel to the surface and perpendicular to the line image thereon, the reticle means being fixedly mounted in relation to the microscope means, and said means for moving the reticle line being adapted to move the microscope means, including the reticle means, in said direction.

4. The gauge defined in claim 3, wherein the microscope means comprises a barrel structure, track means extending generally parallel to the surface and complemental slider means movably engaging said track means, one of said latter two means being on the base and the other thereof being on the barrel structure for movably supporting the latter on the base, said means for moving the reticle line includes calibrated micrometer screw means interacting between said base and said barrel structure for effecting and measuring relative movement therebetween.

References Cited in the file of this patent

UNITED STATES PATENTS

| | | |
|---|---|---|
| 1,781,002 | Esnault-Pelterie | Nov. 11, 1930 |
| 1,875,134 | Pfund | Aug. 30, 1932 |
| 1,973,066 | Hauser et al. | Sept. 11, 1934 |
| 2,539,597 | Staples | Jan. 30, 1951 |
| 2,607,270 | Briggs | Aug. 19, 1952 |
| 2,713,259 | Grodzinski et al. | July 19, 1955 |

FOREIGN PATENTS

| | | |
|---|---|---|
| 395,649 | Great Britain | July 20, 1933 |
| 602,066 | Germany | Aug. 31, 1934 |
| 855,915 | Germany | Nov. 17, 1952 |

OTHER REFERENCES

A Topographic Microscope by S. Tolansky on pages 56 to 59 of Scientific American, August 1954.